US006955097B1

(12) United States Patent
Madni et al.

(10) Patent No.: US 6,955,097 B1
(45) Date of Patent: Oct. 18, 2005

(54) RADIAL MOVEMENT CAPACITIVE TORQUE SENSOR

(75) Inventors: Asad M. Madni, Los Angeles, CA (US); Jim B. Vuong, Northridge, CA (US); Robert K. Hansen, Burbank, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 0 days.

(21) Appl. No.: 10/842,914

(22) Filed: May 11, 2004

(51) Int. Cl.[7] .............................................. G01L 3/14
(52) U.S. Cl. ........................ 73/862.337; 73/862.045; 73/862.325; 310/40 R
(58) Field of Search ................... 73/862.337, 136 A; 310/40 R; 324/658, 660; 361/298; 317/249

(56) References Cited

U.S. PATENT DOCUMENTS

| 3,517,282 | A | * | 6/1970 | Miller ........................ 361/279 |
| 3,729,991 | A | * | 5/1973 | Hardway, Jr. .......... 73/862.337 |
| 4,963,829 | A | * | 10/1990 | Wereb ........................ 324/660 |
| 5,099,386 | A | * | 3/1992 | Stokes et al. ............. 361/298.5 |
| 6,211,641 | B1 | * | 4/2001 | Johnson et al. ............. 318/660 |
| 6,433,559 | B1 | * | 8/2002 | Lahoreau et al. ........... 324/658 |
| 6,483,321 | B2 | * | 11/2002 | Brasseur ..................... 324/660 |
| 6,564,654 | B2 | * | 5/2003 | Madni et al. .......... 73/862.337 |
| 6,772,646 | B1 | * | 8/2004 | Madni et al. .......... 73/862.337 |

\* cited by examiner

*Primary Examiner*—Edward Lefkowitz
*Assistant Examiner*—Linda Field
(74) *Attorney, Agent, or Firm*—Christie, Parker & Hale, LLP

(57) ABSTRACT

A radial movement capacitive torque sensor includes a pair of concentric capacitor plate rings lying in a common plane, a capacitor plate ring facing the pair of concentric capacitor plate rings, and a paddle assembly disposed between the pair of concentric capacitor plate rings and the capacitor plate ring. The paddle assembly includes a first rotor having a circular opening and having at least one pair of spaced apart bearings mounted thereon, a second rotor having a circular opening and having at least one pivot point located thereon, and at least one paddle having a dielectric head, a curved neck and a body. The curved neck is disposed between a corresponding one of said at least one pair of spaced bearings, and the body is pivotally coupled to a corresponding one of said at least one pivot point. The sensor can be mounted on a shaft having two shaft portions interconnected by an embedded torsion rod to measure the torque applied to the torsion rod when the shaft portions are rotated one with respect to the other.

23 Claims, 6 Drawing Sheets

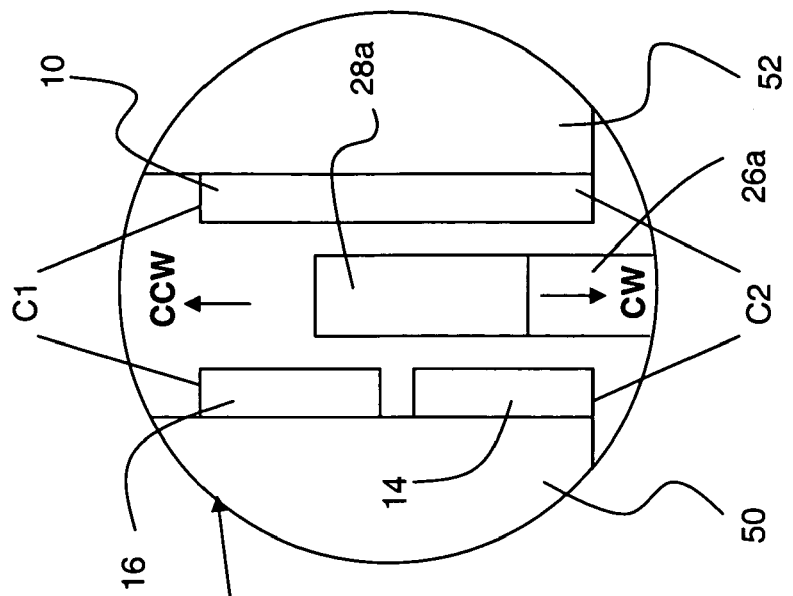
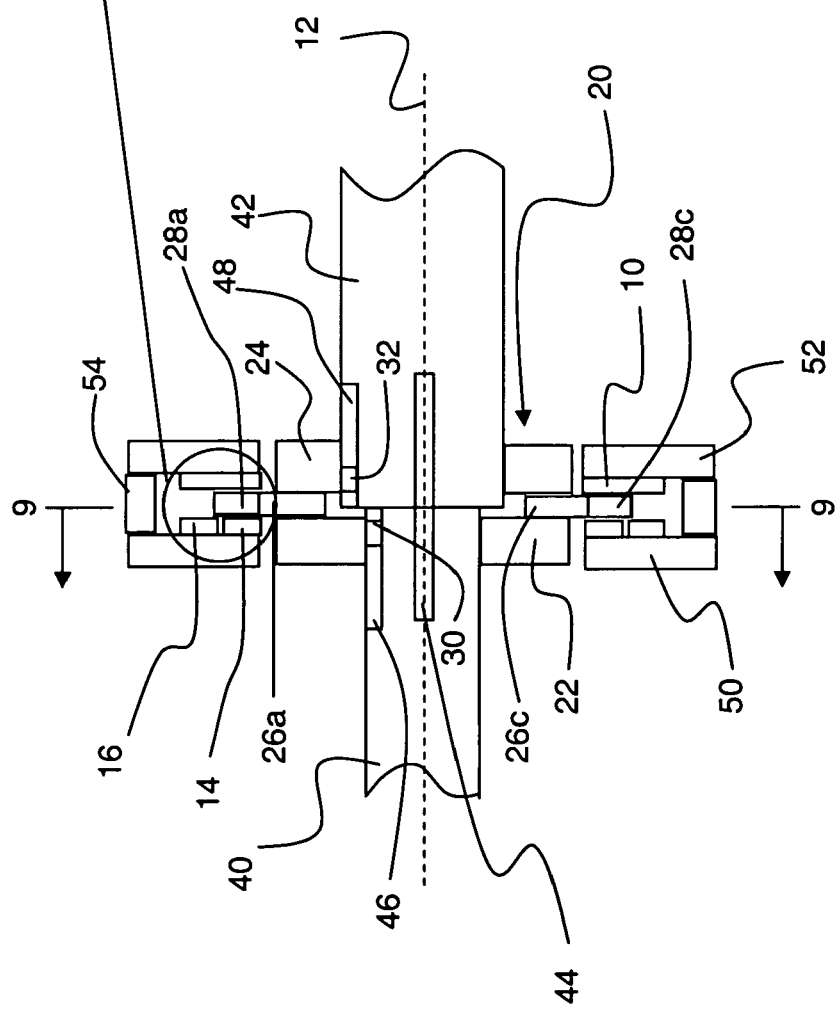
FIG. 6
FIG. 5

RADIAL MOVEMENT CAPACITIVE TORQUE SENSOR

FIELD OF THE INVENTION

The present invention is related to a sensor for automotive applications including steering, and more particularly to a radial movement capacitive torque sensor for a rotating shaft.

BACKGROUND

Recent requirements from the automotive industry for reduced engine power consumption have dictated the replacement of the power steering hydraulic pump with a more efficient electric motor geared to the steering shaft to assist the steering effort. The main difficulty has been with sensing the effort being applied by the driver so as to know how much to assist in the steering effort.

One sensor for sensing such effort applied by the driver is disclosed in U.S. Pat. No. 6,564,654 entitled "Vertical Movement Capacitive Torque Sensor." This patent discloses using capacitive sensing technology, in which capacitances formed using two concentric ring plates are varied depending on the location of a dielectric material. The sensor has a plurality of dielectric vanes that move perpendicularly to an axis of rotation of the shaft on which the sensor is mounted. In one exemplary embodiment of this patent, each vane is biased by a biasing member to realize such movement in the perpendicular direction. Any such biasing member may introduce undesirable and/or unpredictable forces or torques into the sensor.

Therefore, it is desirable to provide an apparatus and method for sensing the driver's effort without biasing the dielectric material.

SUMMARY

In an exemplary embodiment of the present invention, a radial movement capacitive torque sensor is provided. The sensor includes a pair of concentric capacitor plate rings lying in a common plane, a capacitor plate ring facing the pair of concentric capacitor plate rings, and a paddle assembly disposed between the pair of concentric capacitor plate rings and the capacitor plate ring. The paddle assembly includes a first rotor having a circular opening and having at least one pair of spaced apart bearings mounted thereon, a second rotor having a circular opening and having at least one pivot point located thereon, and at least one paddle having a dielectric head, a curved neck and a body. The curved neck is disposed between a corresponding one of said at least one pair of spaced apart bearings, and the body is pivotally coupled to a corresponding one of said at least one pivot point.

In another exemplary embodiment of the present invention, is provided a radial movement capacitive torque sensor for a rotating shaft having an axis of rotation and having two shaft portions for which torque applied to one shaft portion causes an angular displacement with respect to the other shaft portion. The sensor includes a pair of concentric capacitor plate rings lying in a common plane and encircling said one shaft portion, a capacitor plate ring facing the pair of concentric capacitor plate rings and encircling the other shaft portion, and a paddle assembly disposed between the pair of concentric capacitor plate rings and the capacitor plate ring. The paddle assembly includes a first rotor having a circular opening for engaging said one shaft portion and having at least one pair of spaced apart bearings mounted thereon, a second rotor having a circular opening for engaging the other shaft portion and having at least one pivot point located thereon, and at least one paddle having a dielectric head, a curved neck and a body. The curved neck is disposed between a corresponding one of said at least one pair of spaced bearings, and the body is pivotally coupled to a corresponding one of said at least one pivot point.

In yet another exemplary embodiment of the present invention, a method of measuring torque between two shaft portions for which applied torque to one shaft portion causes an angular displacement with respect to the other shaft portion, is provided. A dielectric head of a paddle is moved in a generally radially outward direction between a pair of concentric capacitor plate rings lying in a common plane and encircling said one shaft portion and a capacitor plate ring facing the pair of concentric capacitor plate rings and encircling the other shaft portion, when the one shaft portion is rotated in a first direction with respect to the other shaft portion. The dielectric head of a paddle is moved in a generally radially inward direction between the pair of concentric capacitor plate rings and the capacitor plate ring, when the one shaft portion is rotated in a second direction with respect to the other shaft portion. The paddle has a body and a curved neck disposed between the body and the dielectric head. The neck is disposed between a pair of spaced apart bearings substantially fixed with respect to the one shaft portion. The body is pivotally coupled to a pivot point which is substantially fixed with respect to the other shaft portion.

These and other aspects of the invention will be more readily comprehended in view of the discussion herein and accompanying drawings.

BRIEF DESCRIPTION OF THE DRAWINGS

FIG. 5 is a simplified cross-sectional view illustrating how the components of a radial movement capacitive torque sensor in an exemplary embodiment of the present invention are interconnected and installed on a shaft;

FIG. 6 is an enlarged view illustrating the movement of a head of a paddle responsive to the rotation of the shafts in clockwise and counter clockwise directions;

DETAILED DESCRIPTION

Capacitive sensing technology is well known. The value of a capacitor depends on the permitivity of the dielectric material between the capacitor plates, the area of the plates and the distance between the two plates. By way of example, the value of the capacitance C in a capacitor having two parallel identical metal plates, is given by $C=\epsilon A/d$, where $\epsilon$ is the dielectric constant, A=the area of one plate, and d=the distance between the two plates. Any one of these parameters may be used in the sensing process.

Figure 1A:
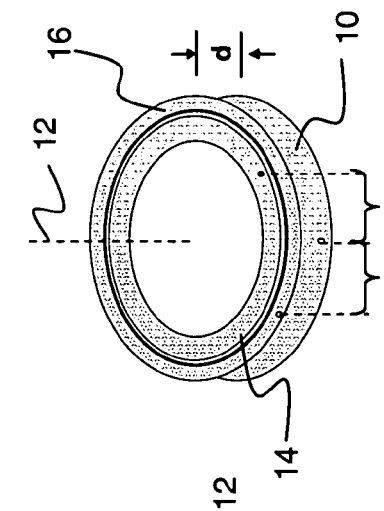
FIG. 1A is a plan view of a ring capacitor plate in an exemplary embodiment of the present invention.
Figure 1B:
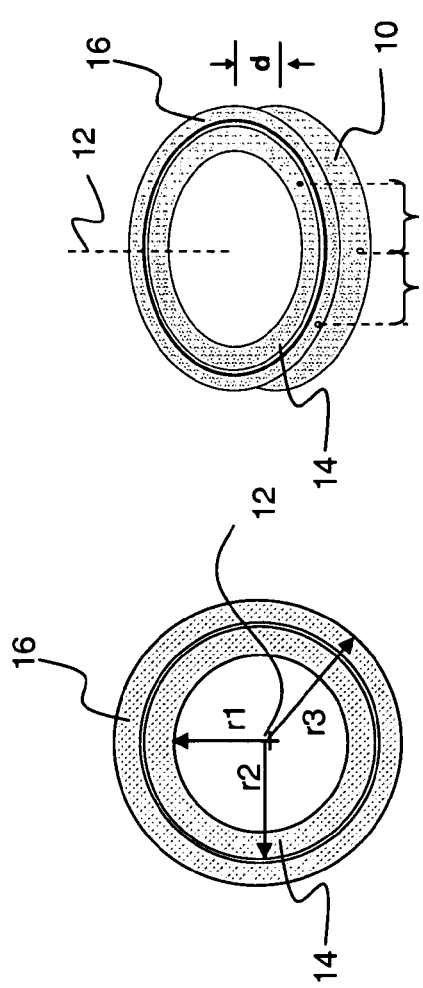
FIG. 1B is a plan view of two capacitor plates of concentric rings in an exemplary embodiment of the present invention.
Figure 2:
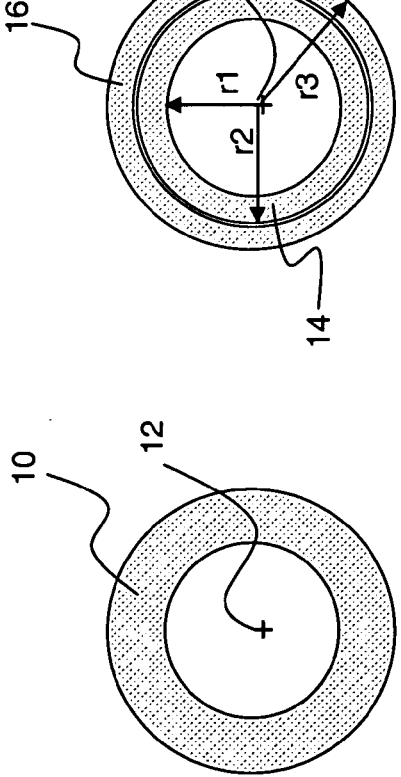
FIG. 2 is a perspective view of the combination of the capacitor plate rings in FIGS. 1 and 2 as they would actually be used on a shaft whose torsion is to be determined.

FIGS. 1A, 1B and 2 illustrate metal plates that form the capacitors in exemplary embodiments of the present invention without the inserted dielectric. FIG. 1A shows an annular or ring-type capacitor plate 10 encircling an axis of rotation 12. The axis of rotation may be a rotation axis of a shaft on which the sensor is mounted. Capacitance is formed between the capacitor plate 10 and a pair of concentric ring-type capacitor plates 14 and 16, shown in FIG. 1B, lying in the same plane with each other and encircling the shaft axis 12.

As can be seen in FIG. 2, a capacitor Cl is formed by the outer capacitor plate 16 and the capacitor plate 10, and a capacitor C2 is formed by the inner capacitor plate 14 and the capacitor plate 10. The capacitor plate 10 and the concentric capacitor plates 14 and 16 are separated by a distance d. In the gap between the capacitor plate 10 and the concentric capacitor plates 14 and 16, a movable dielectric material may be disposed such that the capacitances of the C1 and C2 capacitors can be adjusted by moving the dielectric material in a generally radial direction between the capacitor plates 14 and 16.

The capacitor plates 14 and 16 should have equal areas in order to provide a balanced capacitive output (i.e., C1 and C2 have an identical capacitance) at zero torque. Equal areas can easily be provided by simple geometry. Referring to FIG. 1B where the three pertinent radii are shown for equal area capacitive plates, the following formula is applicable: $r_2=$ $$\sqrt{\frac{r_1^2+r_3^2}{2}},$$

where $r_1$ is the inner radius of the inner ring 14, $r_2$ is the outer radius of the inner ring 14, which is approximately equal to the inner radius of the outer ring 16, and $r_3$ is the outer radius of the outer ring 16.

Figure 3:
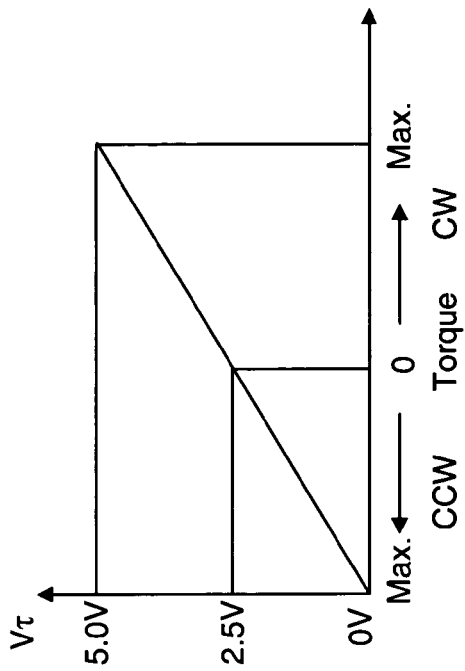
FIG. 3 is a schematic diagram of circuitry for processing the capacitors of FIG. 2.
Figure 4:
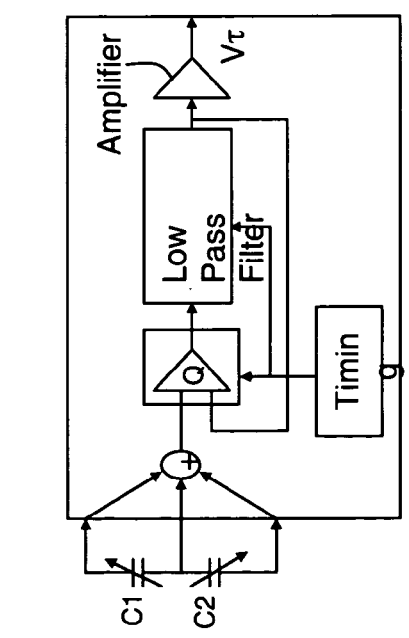
FIG. 4 is a graph showing the relationship between the output voltage of the sensor in an exemplary embodiment of the present invention, and the applied torque.

Referring now to FIGS. 3 and 4, when the capacitances of the capacitors C1 and C2 are compared, they produce the output voltage VT and as illustrated in FIG. 4 when there is a balanced condition at, for example, 2.5 volts, this indicates zero torque. The output voltage VT corresponding to the maximum clockwise torque may be slightly less than 5.0 volts and the output voltage VT corresponding to the maximum counter-clockwise torque may be slightly above 0.0 volts. Of course, in other embodiments, a capacitive sensor may be configured such that the output voltage VT decreases as the clockwise torque is applied, and increases as the counter clockwise torque is applied.

A typical off-the-shelf capacitive sensor driver based on Application Specific Integrated Circuit (ASIC) as shown in FIG. 3 is readily available and provides a suitable signal conditioning circuit. This circuit is based on a charge compensation feedback loop, and converts the difference of two capacitances, relative to their sum, into an analog voltage. The output characteristic of this signal conditioning circuit is:

$$V\tau = \left(1 + G \cdot \frac{C1 - C2}{C1 + C2}\right).$$

$$\frac{Vcc}{2}$$

where G is the gain of the amplifier and Vcc is the supply voltage of the ASIC chip. Since the sensor is based on a ratiometric arrangement, environmental effects such as humidity, temperature, etc. will have a minimal effect on the accuracy due to the fact that the value of C1 and C2 will track (i.e., increase or decrease proportionally to) each other.

FIG. 5 illustrates a radial movement capacitive torque sensor in an exemplary embodiment of the present invention mounted on a shaft formed by joining a smaller shaft 40 ("upper shaft") with a larger shaft 42 ("lower shaft") using a torsion rod 44, which is embedded in the shafts 40 and 42. When a torque is applied to the torsion rod, the twist on the torsion rod results in an angular displacement between the upper and lower shafts. The applied torque is detected by the torque sensor and is then converted into a voltage that represents the torque applied. The angular displacement is directly proportional to the amount of torque applied. The torsion rod 44, for example, may provide a movement of 0.3 to 0.5 degrees per Newton-Meter. The torsion rod in other embodiments may have other suitable movement versus torque characteristics. In other embodiments, the diameters of the shafts interconnected by a torsion rod may be substantially identical to each other.

The shaft 40 has formed thereon a groove 46 to which a protrusion 30 of a first rotor 22 is engaged. The shaft 42 has formed thereon a groove 48 to which a protrusion 32 of a second rotor 24 is engaged. Thus engaged, the first rotor 22 is locked to and rotates together with the smaller shaft 40, whereas the second rotor 24 is locked to and rotates together with the larger shaft 42. At zero torque, the grooves 46 and 48 should be aligned as shown in FIG. 5. In other embodiments, the rotors may be rigidly attached to the respective shafts using any other suitable method such as via friction, spline, epoxy or the like.

In addition to the first and second rotors 22 and 24, the sensor includes printed circuit boards (PCBs) 50 and 52. Each PCB has a generally circular portion, and may also have a rectangular portion attached to the generally circular portion. The PCB board 50 has formed thereon concentric metal rings 14 and 16 that are used to form capacitors C2 and C1, respectively. The diameter of the smaller concentric ring 14 is larger than the diameter of the rotor 22, such that the capacitance of the capacitor C2 is substantially not affected by the rotor 22. The PCB board 52 has formed thereon a single plate ring 10, which has a diameter greater than that of the second rotor 24.

The first rotor 22 and the second rotor 24 form a paddle assembly 20, which also includes a plurality of paddles 26a and 26c. While only two paddles are shown in FIG. 5, the paddle assembly may include more than two (e.g., four) paddles in practice. Each of the paddles has a head (i.e., 28a or 28c), which is moved in a generally radial direction between the concentric rings 14 and 16, such as to adjust the capacitances of the capacitors C1 and C2. The paddles are made of dielectric material such as FR-4, G10 or any other suitable material, or just the heads may be made of dielectric material.

Inherently in the symmetry of the geometry of the paddle assembly 20 is the cancellation of error due to radial run-out in the shaft. As one paddle moves toward one capacitor ring, another paddle 180 degrees away is moving in the opposite direction, thereby canceling the error. By way of example, if the head of one paddle is moved in an inward direction because of radial run-out, the head of another paddle 180 degrees apart is moved in an outward direction. Further, if the head of one paddle is moved in an outward direction because of radial run-out, the head of another paddle 180 degrees apart is moved in an inward direction.

FIG. 6 is an enlarged view which illustrates the movement of the head 28a of the paddle 26a in a generally radial direction. By way of example, if the upper shaft 40 is rotated in a counter clockwise (CCW) direction with respect to the lower shaft 42, the head section 28a moves outward toward the outer ring 16, thereby increasing the capacitance of the capacitor C1. On the other hand, if the upper shaft 40 is rotated in a clockwise (CW) direction with respect to the lower shaft 42, the head section 28a moves inward toward the inner ring 14, thereby increasing the capacitance of the capacitor C2. In other embodiments, the head may move inward when the upper section is rotated in a CCW direction, whereas the head may move outward when the upper section is rotated in a CW direction.

Figure 7:
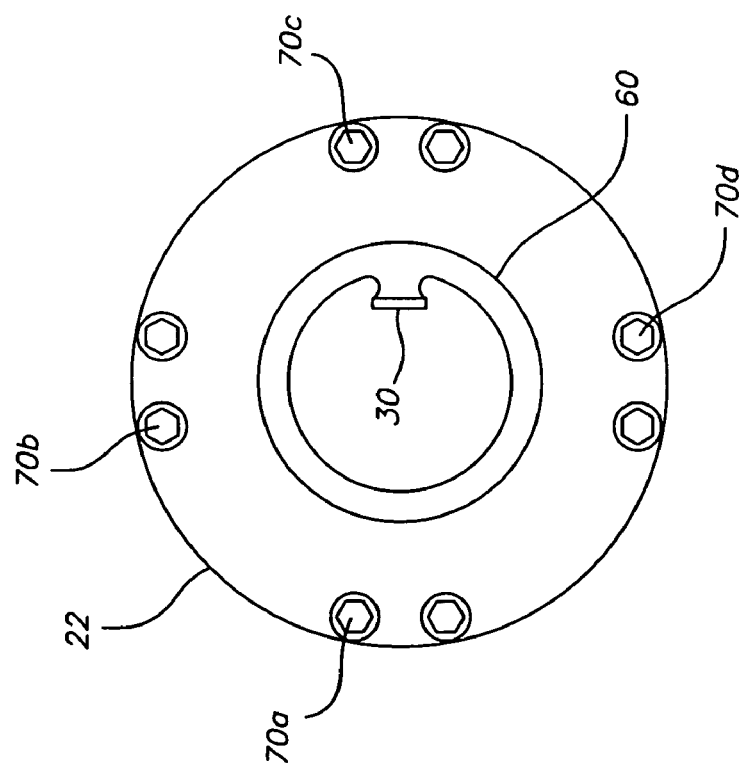
FIG. 7 is a plan view of a first rotor in the sensor of FIG. 5.

As can be seen in FIG. 7, the first rotor 22 has a plurality of pairs of spaced apart bearings 70a, 70b, 70c and 70d formed thereon. In one exemplary embodiment, each bearing is a pin or a post such as a head of an Allen screw. In other embodiments, each bearing may be a cylindrical roller which substantially freely rotates about its center axis. In still other embodiments, each bearing may be a ball bearing or any other suitable structure that can guide the movement of another component that slidingly engages (or rides on) it.

Each pair of spaced apart bearings is located 90 degrees apart from two adjacent pairs of spaced apart bearings. While four pairs of spaced apart bearings are illustrated in FIG. 7, a different number of pairs of spaced apart bearings may be used in other embodiments. The first rotor 22 has an opening at its center for mounting onto a shaft, such as the upper shaft 40 of FIG. 5. The first rotor 22 has a low cylindrical wall 60 around the periphery of the center opening. A protrusion 30 is formed on the inner surface surrounding the opening such that it can be used to engage the upper shaft 40 at the groove 46.

Figure 8:
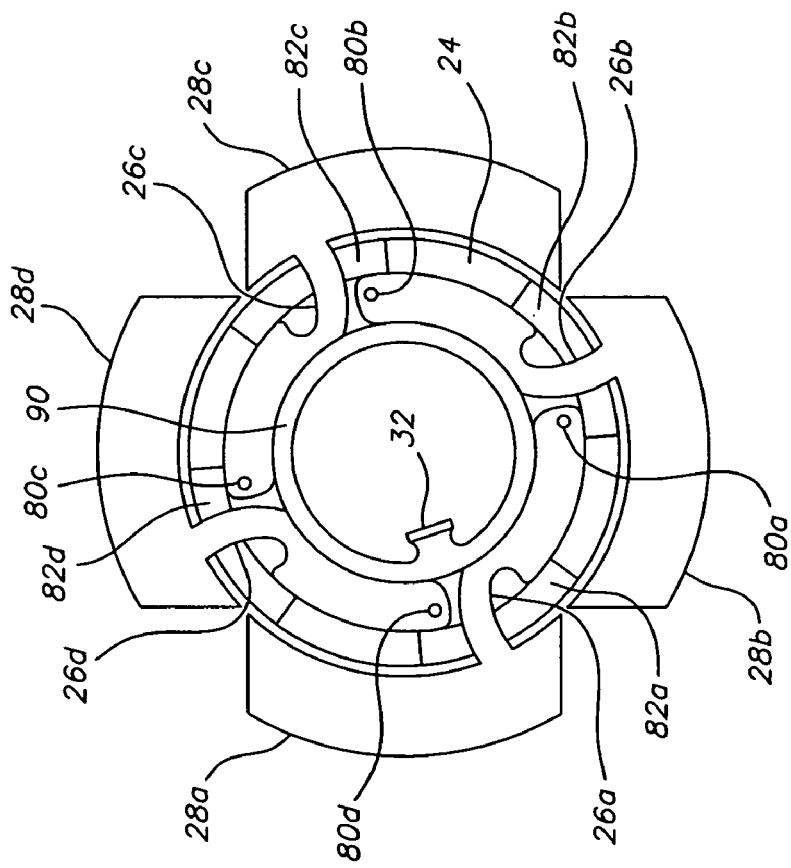
FIG. 8 is a plan view of a second rotor in the sensor of FIG. 5, showing a plurality of paddles pivotally mounted thereon.

In FIG. 8, a plurality of paddles 26a, 26b, 26c and 26d are pivotally coupled to the second rotor 24 at pivot pins ("pivot points") 80a, 80b, 80c and 80d, respectively. While the pivot pins formed on the second rotor 24 are used to make pivot connections in the illustrated embodiment, any other suitable pivot connections may be used in other embodiments. The paddles 26a, 26b, 26c and 26d have heads 28a, 28b, 28c and 28d, respectively, formed on their respective ends away from the respective pivot points. While four paddles are illustrated in FIG. 8, the number of paddles may be different in other embodiments, and would correspond to the number of pairs of spaced apart bearings on the first rotor 22.

In the illustrated embodiment, the second rotor 24 has an opening formed at its center for engaging the lower shaft 42. The opening of the second rotor 24 is larger than the opening of the first rotor 22 because the lower shaft 42 is larger in diameter than the upper shaft 40. Hence, the low cylindrical wall 60 of the first rotor 22 may fit into the center opening of the second rotor 24 when the paddle assembly is assembled. The second rotor 24 also has a low cylindrical wall 90 around the periphery of the opening. Also, a protrusion 32 for engaging the groove 48 of the lower shaft 42 is formed on the inner surface surrounding the opening.

The second rotor 24 has also formed thereon on the surface facing the first rotor 22 a plurality of depressed areas 82a, 82b, 82c and 82d. The depressed areas are located such that they engage the corresponding pairs of spaced apart bearings mounted on the first rotor 22. As will be discussed in more detail below in reference to FIGS. 9A–9C, a neck of each paddle is placed between a corresponding pair of spaced apart bearings on the first rotor 22. Since each pair of spaced apart bearings engage the corresponding depressed area, when the first and second rotors are rotated with respect to each other, the bearings and the depressed areas together prevent the rotors from rotating beyond a predetermined rotation angle range. By way of example, the rotation angle range may be ±8 degrees in one exemplary embodiment. In other embodiments, the rotation angle range may vary from ±1 to ±10 degrees, or may be any other suitable range of degrees.

The shape and operation of the paddle 26c and the spaced apart bearings 70a will be described below in reference to FIGS. 9A, 9B and 9C, with the understanding that the other pairs of spaced apart bearings and the paddles have substantially the same structure and operate in substantially the same manner as the paddle 26c and the spaced apart bearings 70a illustrated in FIGS. 9A–9C.

Figure 9A:
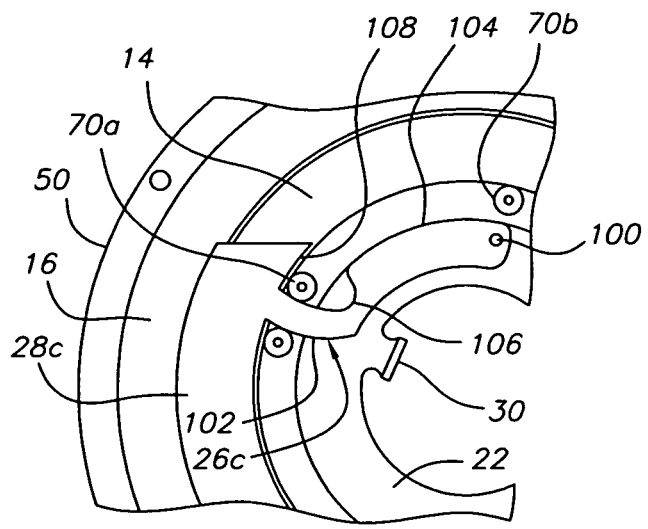
FIGS. 9A, 9B and 9C are partial cut-away views of a paddle assembly, taken in the direction 9—9 of FIG. 5, showing different operational conditions.

FIG. 9A shows only one of the paddles, namely, the paddle 26c, of the paddle assembly 20. It can be seen in FIGS. 7 and 8, when the first and second rotors 22 and 24 are assembled together, the pair of spaced apart bearings 70a would engage the paddle 26c and the depressed area 82c.

In addition to the head 28c, the paddle 26c includes a neck 102 and a body 104. The neck may also be referred to as an "arm". Near the end of the body 104 away from the neck 102 is formed a hole 100, which is used to pivotally couple the paddle 26c to the pivot pin 80c on the first rotator 22. As indicated previously, the pivot point in other embodiments may be formed by any suitable pivot connection, which may be different from the pivot pin and the hole. The body 104 is curved with a curvature that generally tracks the curvature of the circular opening at the center of the first rotor 22. Between the neck 102 and the body 104 is formed a cove 106, which engages one of the spaced apart bearings 70a when the paddle 26c is at a most outward-extended position.

It can be seen in FIG. 9A that the neck 102 is between the pair of spaced apart bearings 70a. The neck 102 has a gentle curvature having a radius of curvature R, such that the head 28c moves outwardly not only in a radial direction, but also in a circumferential direction, as the neck having the radius R rides on the bearings. The neck has an outline of two curved lines that are substantially equidistant from each other through the length of the curves. The distance between the curves are substantially the same as the spacing between the spaced apart bearings 70a such that the neck slidably engages the bearings on both sides as the paddle 26c is moved between the bearings. Hence, a desmodronic approach has been taken for the design of the paddle and the spaced apart bearings, where the inner and outer radii (i.e., inwardly curved and outwardly curved curves) of the paddle neck are captured between the spaced apart bearings, and the paddle is forced to travel in a predetermined direction between the same. Using this technique, substantially no rotational bias is applied to the sensor in either direction.

In the illustrated embodiment, when the rotor 24 is rotated in a counter clockwise direction with respect to the rotor 22, the neck exerts force mainly on the bearing on the convex ("outwardly curved") side of the neck, such that the neck can be said to ride on the bearing on its convex side. On the other hand, when the rotor 24 is rotated in a clockwise direction with respect to the rotor 22, the neck exerts force mainly on the bearing on the concave ("inwardly curved") side of the neck, such that the neck can be said to ride on the bearing on its concave side.

By adjusting the radius R and/or the pivot point on the second rotor 24, a linear relationship between the rotation of the rotors and the radial movement of the head 28c may be realized, as those skilled in the art would appreciate. Those skilled in the art would also appreciate that other desired (e.g., non-linear) relationship between the rotational movement of the rotors and the radial movement of the head 28c may be realized by varying the radius R, the concavity/convexity of the neck and/or the location of the pivot point.

In FIG. 9A, the portion 108 of the head opposite the cove 106 is proximate to one of the pair of spaced apart bearings 70a, and the head 28c mainly covers the inner ring 14, such that the capacitance of the inner capacitor C2 is higher than the capacitance of the outer capacitor C1.

When a counter clockwise torque is applied to the shaft assembly, the pivot point (i.e., the hole 100) of the paddle 26c is moved closer to the bearings 70a (and away from the bearings 70b). This causes the paddle to move outward as the neck 102 rides along the bearings 70a. This motion causes the value of the capacitor C1 to increase and the value of the capacitor C2 to decrease.

Figure 9B:
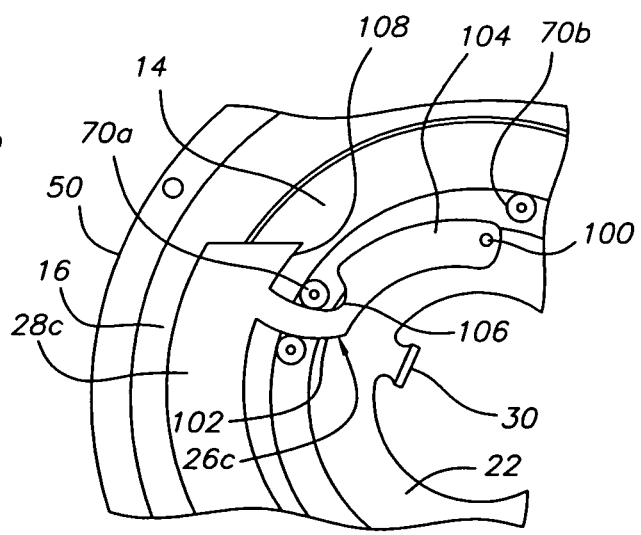

It can be seen in FIG. 9B, by the movement of the hole 100 which is pivotally coupled to the pivot pin 80c, that the second rotor 24 (not shown) has rotated in a counter clockwise direction with respect to the first rotor 22. The head 28c has moved outward in a generally radial direction. Also, because of the curvature of the neck 102 disposed between the spaced apart bearings 70a, the paddle 26c has pivotally rotated in a clockwise direction about the pivot pin 80c.

When the spaced apart bearings 70a are placed at substantially the middle of the neck 102 having the curvature radius R, the head is substantially symmetrically positioned over the outer and inner rings as shown in FIG. 9B. In other words, the head 28c in FIG. 9B covers approximately equal amount of the outer ring 16 and the inner ring 14. At this point, the capacitance of the capacitor C1 is substantially equal to the capacitance of the capacitor C2.

Figure 9C:
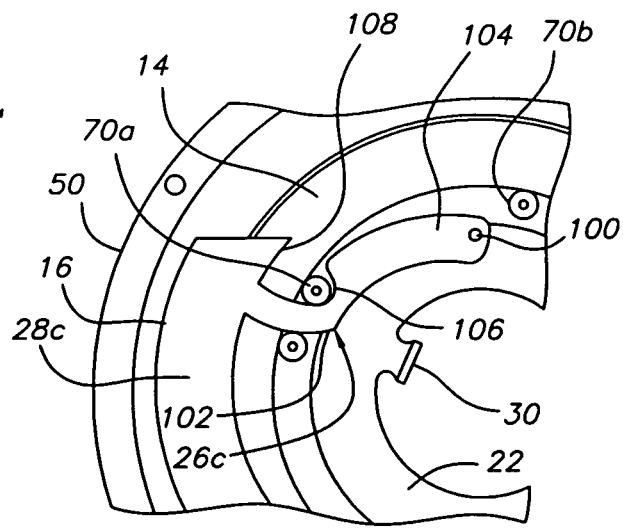

In FIG. 9C, the second rotor 24 (not shown) has further rotated counter clockwise with respect to the first rotor 22. It can be seen that the hole 100 has moved further away from an adjacent pair of spaced apart bearings 70b on the first rotor 22. Accordingly, the head 28c has moved further outwardly as the neck 102 has moved outward through the pair of spaced apart bearings 70a. It can be seen in FIG. 9C that one of the spaced apart bearings 70a is disposed substantially within the cove 106. In addition, the paddle 26c has further rotated in a clockwise direction with respect to the pivot pin 80c (i.e., the pivot point at which the hole 100 is pivotally coupled).

At this point, when a clockwise torque is applied to the shaft assembly, the pivot point is moved away from the bearings 70a (and toward the bearings 70b), thus allowing the head 28c to move inward as the neck having radius R rides along the bearings 70a. This motion allows the value of the capacitor C2 to increase and the value of the capacitor C1 to decrease. By changing the configuration/shape of the paddles, more particularly the design of the neck, the paddle and its head can be made to move in different directions at different rates as the rotors 22 and 24 rotate one with respect to the other.

A major contributor to hysteresis in the radial movement capacitive torque sensor as described above is any free play in the movement of the paddles. To reduce this movement to a reasonable level would require that mechanical dimensions be held to very exacting tolerances, and this translates to an increase to the cost of the sensor.

One method of making up for looser tolerances is to spring load the paddle radius (i.e., neck of the paddle) against one of the bearings. The problem with a spring, however, is that the force is always in one direction. This force will aid movement of the paddle in one direction while hindering the movement in the opposite direction. Such spring bias would also show up as hysteresis.

Figure 10:
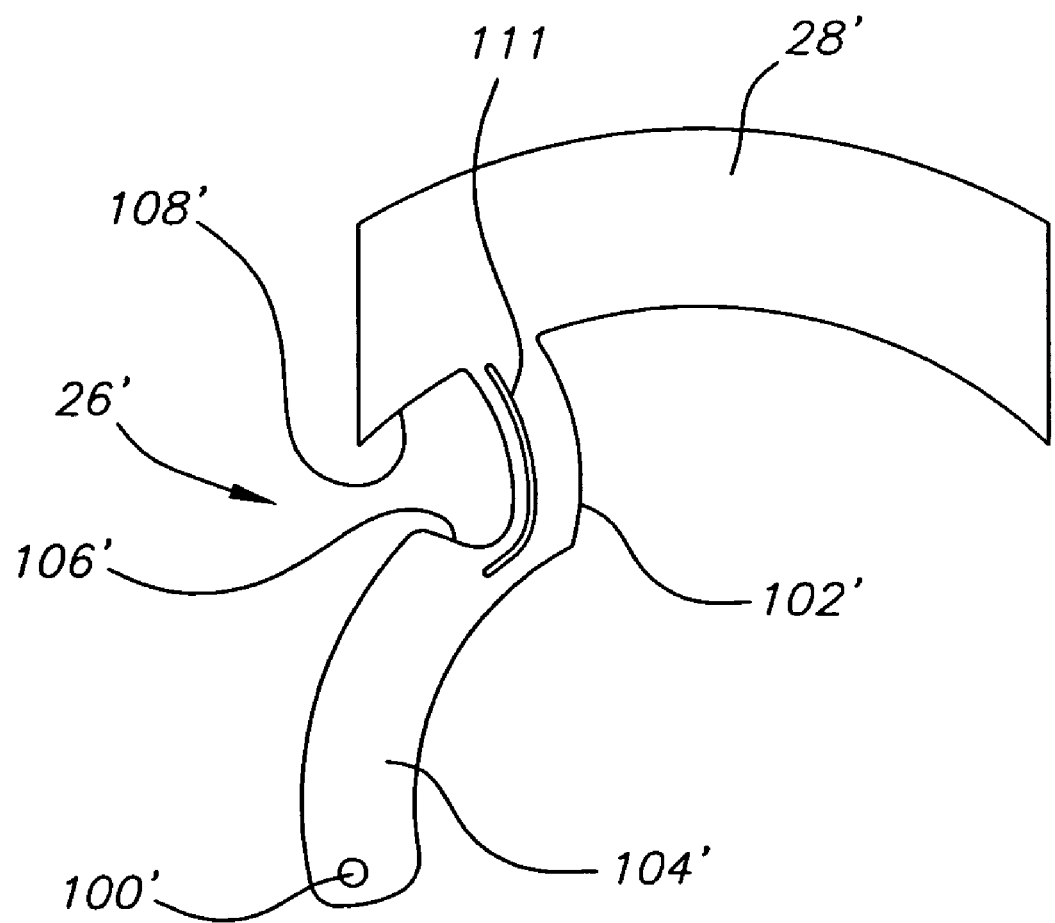
FIG. 10 is a plan view of a paddle in another exemplary embodiment of the present invention.

In another exemplary embodiment of the present invention, the inside radius ("inwardly curved curve") and the outside radius ("outwardly curved curve") of the paddle neck is equally spring loaded against their respective bearings without favoring movement in any direction. A paddle 26' of FIG. 10 is one such paddle having an integral spring in a neck 102' in another exemplary embodiment of the present invention.

The paddle 26' may be used to replace each of the paddles 26a–26d in FIG. 8, and has components corresponding to the paddle 26c illustrated in FIGS. 8 and 9A–9C. Hence, the paddle 26' has a head 28', a hole 100', a neck ("arm") 102', a body 104', a cove 106', and a portion 108' of the head opposite the cove 106'. In addition, the paddle 26' has a slot 111 cut in the neck to form the integral spring. The slot 111 is a short distance away from, and generally tracks the curvature of the inside radius of the neck 102'. The slot 111 is slightly longer than the traveling distance of the spaced apart bearings, as it starts approximately at the junction between the head 28' and the neck 102', and runs all the way down along the neck 102' to approximately the junction between the neck 102' and the body 104' This causes the surface riding on the inside bearing to be slightly springy. Then, by machining the inside radius for a 0.001 inch ("0.00254 cm") interference, for example, the neck 102' is always in intimate contact with both bearings and the source of free play is substantially eliminated. In other words, the width between the curves of the neck is made slightly larger (e.g., by 0.001 inch) than the distance between the spaced apart bearings.

Figure 11:
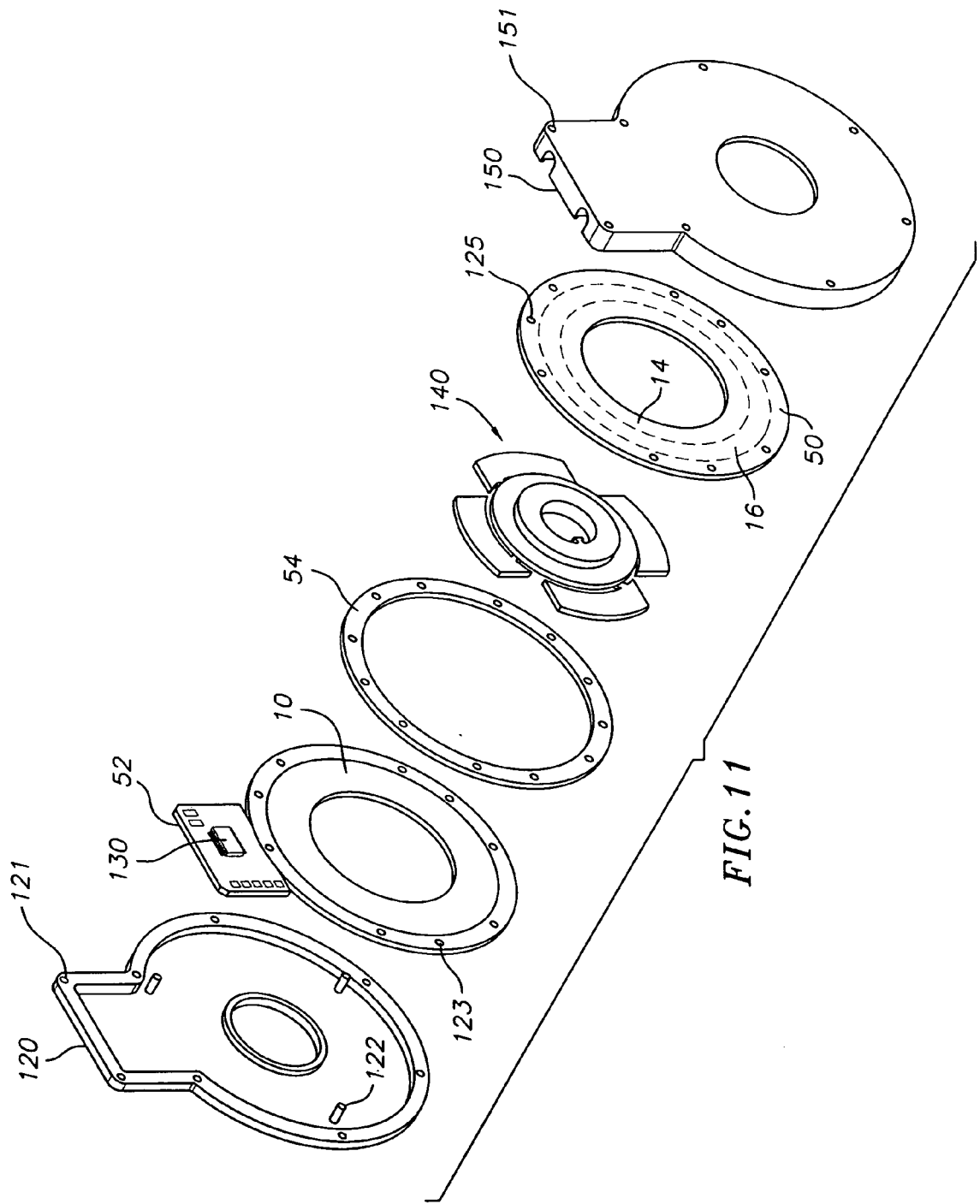
FIG. 11 is an exploded perspective view of the sensor of FIG. 5, showing how the components would be assembled together for installation on a shaft.

FIG. 11 is an exploded view of the radial movement capacitive torque sensor in an exemplary embodiment of the present invention. The sensor has covers 120 and 150 that can be fixed to each other through a plurality of holes 121 and 151 formed along their respective peripheries. The first cover 120 also has a plurality of guide pins 122 formed thereon for aligning the other components when they are installed between the covers.

The PCB 52 has formed thereon a plurality of openings 123 for engaging the guide pins 122. The PCB 52 has also formed thereon a capacitor ring plate 10, and a rectangular portion on which one or more ASIC/logic chips 130 are mounted. A paddle assembly 140 is placed between the PCB 52 and the PCB 50. The PCB 50 has formed thereon a pair of concentric ring plates 14 and 16. When installed, the concentric ring plates 14 and 16 should face the ring plate 10 such that capacitance is formed therebetween. A spacer ring 54 is inserted between the PCB 52 and the PCB 50 such that the heads of the paddles in the paddle assembly 140 are substantially free to rotate between the metal ring plates on the PCBs. The PCB 50 also has a plurality of guide holes 125 for engaging the guide pins 122. Finally, a cover 150 is placed on top of the PCB 50 to form the sensor package.

While certain exemplary embodiments of the present invention have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A radial movement capacitive torque sensor comprising:
    a pair of concentric capacitor plate rings lying in a common plane;
    a capacitor plate ring facing the pair of concentric capacitor plate rings; and
    a paddle assembly disposed between the pair of concentric capacitor plate rings and the capacitor plate ring, comprising:
        a first rotor having a circular opening and having at least one pair of spaced apart bearings mounted thereon;
        a second rotor having a circular opening and having at least one pivot point located thereon; and
        at least one paddle having a dielectric head, a curved neck and a body, wherein the curved neck is disposed between a corresponding one of said at least one pair of spaced apart bearings, and the body is pivotally coupled to a corresponding one of said at least one pivot point.

2. The radial movement capacitive torque sensor of claim 1, wherein the head moves in both radial and circumferential directions with respect to the second rotor when the first rotor is rotated with respect to the second rotor.

3. The radial movement capacitive torque sensor of claim 1, wherein the second rotor has formed on its surface facing the first rotor, at least one depressed area corresponding to and engaging said at least one pair of spaced apart bearings, such that the rotational movement of the rotors are limited by engagement between said at least one pair of spaced apart bearings and said at least one depressed area.

4. The radial movement capacitive torque sensor of claim 1, wherein at least one of the first and second rotors has a protrusion formed on a surface surrounding its circular opening, such that the protrusion can be used to engage a groove on a shaft.

5. The radial movement capacitive torque sensor of claim 1, wherein the paddle assembly has four paddles, and the first rotor has four pairs of spaced apart bearings, each engaging one of the four paddles.

6. The radial movement capacitive torque sensor of claim 1 wherein at least one of the pair of concentric capacitor plate rings and the capacitor plate ring is disposed on a printed circuit board (PCB).

7. The radial movement capacitive torque sensor of claim 1, wherein the dielectric head of said at least one paddle moves in a generally outward radial direction when the first rotor is rotated in a first direction with respect to the second rotor.

8. The radial movement capacitive torque sensor of claim 7, wherein the dielectric head of said at least one paddle moves in a generally inward radial direction when the first rotor is rotated in a second direction with respect to the second rotor.

9. The radial movement capacitive torque sensor of claim 1, wherein the second rotor has mounted thereon a pivot pin at said at least one pivot point, and the body has formed thereon an opening for pivotally coupling to the pivot pin.

10. The radial movement capacitive torque sensor of claim 1, wherein the curved neck of said at least one paddle has a slot formed thereon to form an integral spring on the curved neck.

11. A radial movement capacitive torque sensor for a rotating shaft having an axis of rotation and having two shaft portions for which torque applied to one shaft portion causes an angular displacement with respect to the other shaft portion, said sensor comprising:
    a pair of concentric capacitor plate rings lying in a common plane and encircling said one shaft portion;
    a capacitor plate ring facing the pair of concentric capacitor plate rings and encircling the other shaft portion; and
    a paddle assembly disposed between the pair of concentric capacitor plate rings and the capacitor plate ring, comprising:
        a first rotor having a circular opening for engaging said one shaft portion and having at least one pair of spaced apart bearings mounted thereon;
        a second rotor having a circular opening for engaging the other shaft portion and having at least one pivot point located thereon; and
        at least one paddle having a dielectric head, a curved neck and a body, wherein the curved neck is disposed between a corresponding one of said at least one pair of spaced apart bearings, and the body is pivotally coupled to a corresponding one of said at least one pivot point.

12. The radial movement capacitive torque sensor of claim 11, wherein the two shaft portions are interconnected to each other using a torsion rod.

13. The radial movement torque sensor of claim 11, wherein the head moves in both radial and circumferential directions when the first rotor is rotated with respect to the second rotor.

14. The radial movement torque sensor of claim 11, wherein the second rotor has formed on its surface facing the first rotor, at least one depressed area corresponding to and engaging said at least one pair of spaced apart bearings, such that the rotational movement of the rotors are limited by engagement between said at least one pair of spaced apart bearings and said at least one depressed area.

15. The radial movement torque sensor of claim 11, wherein at least one of the first and second rotors has a protrusion formed on a surface surrounding its circular opening, such that the protrusion can be used to engage a groove on a corresponding one of the shaft portions.

16. The radial movement torque sensor of claim 11 wherein at least one of the pair of concentric capacitor plate rings and the capacitor plate ring is disposed on a printed circuit board (PCB).

17. The radial movement torque sensor of claim 11, wherein the dielectric head of said at least one paddle moves in a generally outward radial direction when the first rotor is rotated in a first direction with respect to the second rotor.

18. The radial movement torque sensor of claim 17, wherein the dielectric head of said at least one paddle moves in a generally inward radial direction when the first rotor is rotated in a second direction with respect to the second rotor.

19. The radial movement capacitive torque sensor of claim 11, wherein the curved neck of said at least one paddle has a slot formed thereon to form an integral spring on the curved neck.

20. A method of measuring torque between two shaft portions for which torque applied to one shaft portion causes an angular displacement with respect to the other shaft portion, the method comprising:

moving a dielectric head of a paddle in a generally radially outward direction between a pair of concentric capacitor plate rings lying in a common plane and encircling said one shaft portion and a capacitor plate ring facing the pair of concentric capacitor plate rings and encircling the other shaft portion, when the one shaft portion is rotated in a first direction with respect to the other shaft portion; and moving the dielectric head of a paddle in a generally radially inward direction between the pair of concentric capacitor plate rings and the capacitor plate ring, when the one shaft portion is rotated in a second direction with respect to the other shaft portion, wherein the paddle has a body and a curved neck disposed between the body and the dielectric head, and wherein the curved neck is disposed between a pair of spaced apart bearings substantially fixed with respect to the one shaft portion, and the body is pivotally coupled to a pivot point which is substantially fixed with respect to the other shaft portion.

21. The method of claim 20, wherein said moving the dielectric head in the generally radially outward direction or said moving the dielectric head in the generally radially inward direction comprises moving the dielectric head in both a generally radial direction and a generally circumferential direction.

22. The method of claim 21, wherein the dielectric head is moved in both the generally radial direction and the generally circumferential direction as the curved neck rides on the pair of spaced apart bearings.

23. The method of claim 20, wherein the shaft portions are interconnected with each other by a torsion rod embedded in the shaft portions.

* * * * *